United States Patent [19]

Fasano et al.

[11] Patent Number: 5,534,097
[45] Date of Patent: Jul. 9, 1996

[54] METHOD OF BONDING A SEAT TRIM COVER TO A FOAM CUSHION UTILIZING MAGNETIC INDUCTION BONDING

[75] Inventors: Clarice Fasano, Bloomfield Hills; Jeffrey J. Frelich, Redford, both of Mich.

[73] Assignee: Lear Corporation, Meeting Place, Pa.

[21] Appl. No.: 300,737

[22] Filed: Sep. 2, 1994

[51] Int. Cl.$^6$ .......................... B32B 31/04; B32B 31/20; B29C 65/14
[52] U.S. Cl. ...................... 156/214; 156/212; 156/272.4; 156/285; 156/311; 156/379.7; 156/382
[58] Field of Search .............................. 156/272.4, 212, 156/214, 285, 382, 311, 379.7, 379.8, 382

[56] References Cited

U.S. PATENT DOCUMENTS

| 3,657,038 | 4/1972 | Lightfoot | 156/106 |
| 3,833,439 | 9/1974 | Smith | 156/219 |
| 3,902,940 | 9/1975 | Heller, Jr. et al. | 156/79 |
| 4,035,547 | 7/1977 | Heller, Jr. et al. | 156/272.4 |
| 4,340,801 | 7/1982 | Ishibashi et al. | 156/379.7 |
| 4,692,199 | 9/1987 | Kozlowski et al. | 156/245 |
| 4,749,833 | 6/1988 | Novorsky et al. | 156/379.7 |
| 4,941,936 | 7/1990 | Wilkinson et al. | 156/274.8 |
| 4,969,968 | 11/1990 | Leatherman | 156/272.4 |
| 5,129,977 | 7/1992 | Leatherman | 156/272.4 |
| 5,254,197 | 10/1993 | Klems | 156/272.2 |

FOREIGN PATENT DOCUMENTS

| 58-173619 | of 1983 | Japan . |
| 2167726 | of 1988 | Japan . |
| 261692 | of 1992 | Japan . |
| 261691 | of 1992 | Japan . |

*Primary Examiner*—Michele K. Yoder
*Attorney, Agent, or Firm*—Howard & Howard

[57] ABSTRACT

The method includes using a contoured mold (22) with copper tubing (40) coiled and embedded beneath the contoured surface. The fabric or trim cover (14) and an adhesive film (16) is placed on the mold (22) and drawn by a vacuum in to contour with the mold (22). The foam cushion (12) is placed thereon in compression. The adhesive film (16) includes a polyamide resin doped with micron sized ferromagnetic particles. Copper coil tubing (40) is energized by an oscillatory radio frequency generator (50) to produce a magnetic flux to induce eddy currents in the ferromagnetic particles to generate heat to thereby melt the polyamide resin. The adhesive film melts, creating a bond between the trim cover (14) and the foam cushion (12).

7 Claims, 4 Drawing Sheets

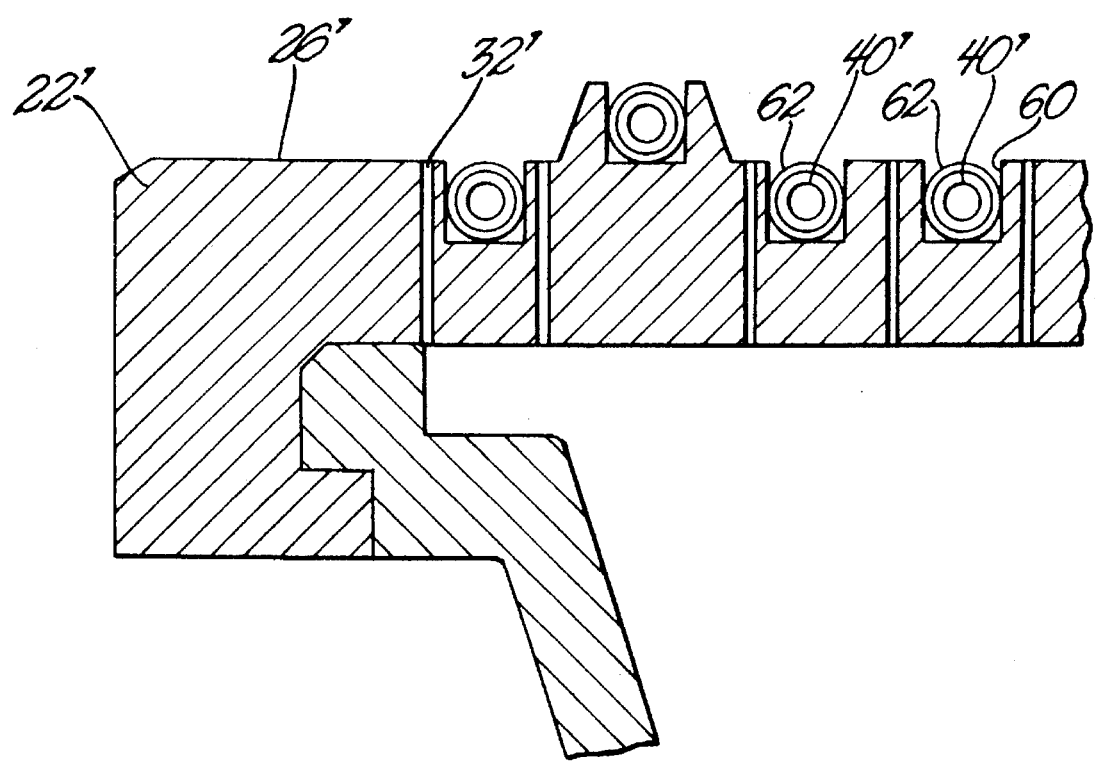

METHOD OF BONDING A SEAT TRIM COVER TO A FOAM CUSHION UTILIZING MAGNETIC INDUCTION BONDING

TECHNICAL FIELD

The subject invention relates to a method and apparatus for securing a fabric cover to a cellular foam pad, such as the type utilized for seating and back cushions in vehicle seats.

BACKGROUND OF THE INVENTION

Significant development activity has been directed toward eliminating the costly, labor intensive cut and sew method of wrapping fabric about a cellular foam pad in automotive seat fabrications. One such development employs contact adhesives applied to the fabric layer, i.e., spray adhesive, and the foam pad to adhesively bond them together. However, once the adhesive is applied, it is difficult to properly position the fabric onto the foam pad resulting in misalignment and/or wrinkles in the bonded fabric.

Other developments have included placing a heat-sensitive adhesive fabric or film between the fabric and the foam pads and subsequently melting the adhesive to effectuate bonding. One known technique for melting the adhesive employs a heated compression mold in contact with the fabric layer to conduct heat through the fabric layer which, in turn, melts the adhesive. In addition to being time consuming, this technique causes non-uniform bonding due to an uneven temperature distribution throughout the adhesive. Additionally, many fabric types which are otherwise well suited for seating applications are made from materials which cannot withstand the high temperature ranges encountered with this technique, i.e., leather and vinyl, thus rendering unusable these otherwise desirable materials.

Another technique for heating and melting the adhesive film uses heated steam injected through either the fabric layer or the foam pad to melt the adhesive. Such a technique is disclosed in U.S. Pat. No. 4,692,199 to Kozlowski et al, assigned to the assignee of the subject invention. As discussed above, certain cover fabrics are sensitive to high temperature environments and may be damaged by the injection of heated steam.

U.S. Pat. No. 5,254,197, assigned to the assignee of the subject invention, discloses adhesively bonding a fabric layer to a cellular foam pad using a heat sensitive adhesive placed therebetween wherein melting of the adhesive is accomplished by utilizing a microwave radiation source which selectively heats and melts the adhesive without damaging the cushion or seat fabric. A problem with this system is that use of microwave heating requires additional time in processing due to transfer of the assembly to the microwave heater, and the requirement of high frequency requires shielding.

Magnetic induction bonding has been utilized for bonding a joint between two substrates. Japanese Patent Numbers 4-261,691 and 4-261,692, both disclose methods for magnetic induction bonding of seat fabrics to cushion pads via the use of hot melt bonding agents containing metallic material. Each of these methods disclose use of a mold having a seat cushion placed thereon. The seat cushion is coated with a hot melt bonding agent during foaming of the pad. A fabric is then placed over the bonding agent and cushion. The bonding agent is melted via electromagnetic induction while the fabric skin is compressed against the seat cushion. The hot melt adhesive includes metallic material, such as iron, stainless steel, lead, etc. The metallic material may be in the form of foil, powder, or granules. The patent specifically discloses using a sheet of foil with the hot melt adhesive on both sides thereof. The bottom die supports the molded pad whereas the top die is hollow to hold the electromagnetic coil and cooling air. The cooling air is forced through the upper die after heating to cool the melted adhesive.

Magnetic induction bonding processes are also illustrated in Japanese Patent Numbers 59-173619 and 2-167726, and U.S. Pat. Nos. 3,833,439 to Smith and 4,941,936 to Wilkinson et al.

U.S. Pat. Nos. 3,902,940 to Heller, Jr. et al and Patent Number 4,969,968 and 5,129,977, both to Leatherman, also disclose methods for the magnetic induction bonding of component parts wherein the parts are bonded via the placement of the adhesive film or coating between the component parts. The adhesive film or coating contains at least ferromagnetic particles in a thermoplastic matrix or medium. The adhesive is melted via micromagnetic radiation to fuse the component parts together.

U.S. Pat. No. 3,657,038 to Lightfoot discloses a method for magnetic induction bonding of two substrates via use of an adhesive composition comprising, in at least one embodiment, ferromagnetic particles in a polyamide.

None of these processes provide a cost effective and simple method of applying a seat cover to a foam pad. Seat covers of various materials must be bonded to foam pads with suitable cohesive failure properties. The subject invention allows accurate positioning and simple assembly of the components to allow for bonding the seat cover to the foam pad.

SUMMARY OF THE INVENTION

The invention includes a method of bonding trim layer to a foam pad. The method includes the steps of: positioning a removable and separate, adhesive film comprising magnetic particles in a thermoplastic material between a trim layer and a precontoured foam pad in a mold; supplying a vacuum to draw the trim layer and adhesive sheet into conforming contour with the foam pad; producing an electromagnetic field by excitation of induction coils in the mold to develop a flux between the coils and magnetic particles in the adhesive film to generate heat to melt the thermoplastic material; compressing together the trim layer and adhesive film and foam pad in the mold to disperse the melted thermoplastic material into the foam pad and trim layer; and cooling the melted adhesive film to produce a bond between the trim layer and foam pad.

The invention also includes an assembly for bonding a trim layer to a precontoured foam pad by an adhesive film. The assembly includes a mold having a predefined contour to support the contour of the precontoured foam pad and including air passages therein. A vacuum source is connected to the mold for drawing air through the passages. A pressure platen opposes the mold for compressing the foam pad and adhesive film and trim layer against the mold. The assembly is characterized by the mold including inductive coils extending therethrough, and a source generator connected to the coils to generate an electromagnetic field in the coils to melt the adhesive film.

FIGURES IN THE DRAWINGS

Other advantages of the present invention will be readily appreciated as the same becomes better understood by reference to the following detailed description when considered in connection with the accompanying drawings wherein:

FIG. 9 is a partial cross-sectional view of a second embodiment of the mold.

DETAILED DESCRIPTION OF THE PREFERRED EMBODIMENT

The subject invention generally relates to an apparatus and method for bonding one material to another, i.e., a seat cover fabric to a foam seat cushion, using a heat activated adhesive. Such is to be generally used in the fabrication of cushion assemblies utilized for seats and backrests in automotive applications.

Figure 2:
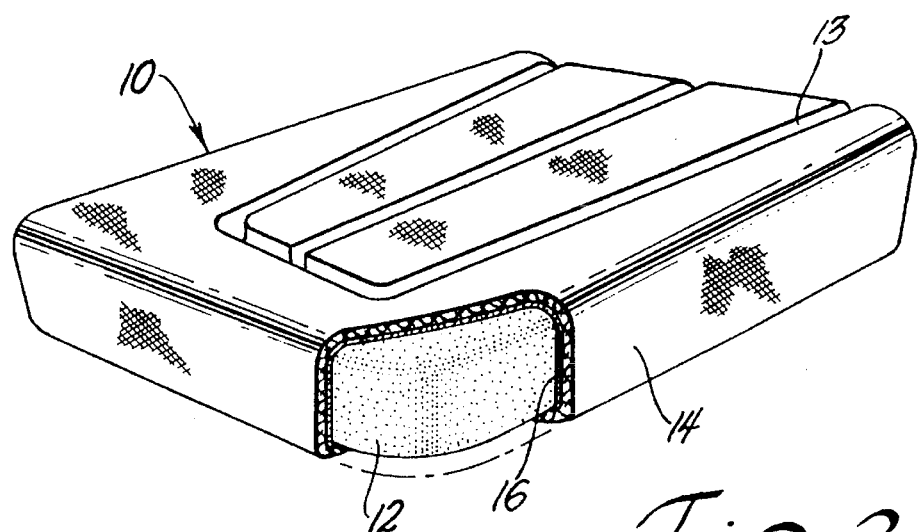
FIG. 2 is a fragmentary cross-sectional view of a cushion constructed in accordance with the subject invention.

The seating assembly 10 (FIG. 2) is comprised of a cellular foam pad 12 and a fabric layer or trim cover 14 with a heat sensitive adhesive film or sheet 16 disposed therebetween. The foam pad 12 is preferably precontoured and prefabricated from any of a number of well known materials now utilized as cushion materials, such as polyester or polyurethane. The fabric layer 14 may be of any type of fabric utilized as decorative covers for automotive vehicle seats, including woven fabrics, leather, vinyl, etc. The adhesive 16 is preferably a substantially air impervious adhesive film or sheet in its non-activated or non-heated condition, wherein upon heating and melting thereof, the adhesive sheet 16 disperses within the fabric layer 14 and foam pad 12 while bonding the fabric layer 14 to the foam pad 12 in a secure manner allowing the adhesive layer 16 to become air permeable. Description of the adhesive layer 16 will be subsequently discussed in detail.

Figure 1:
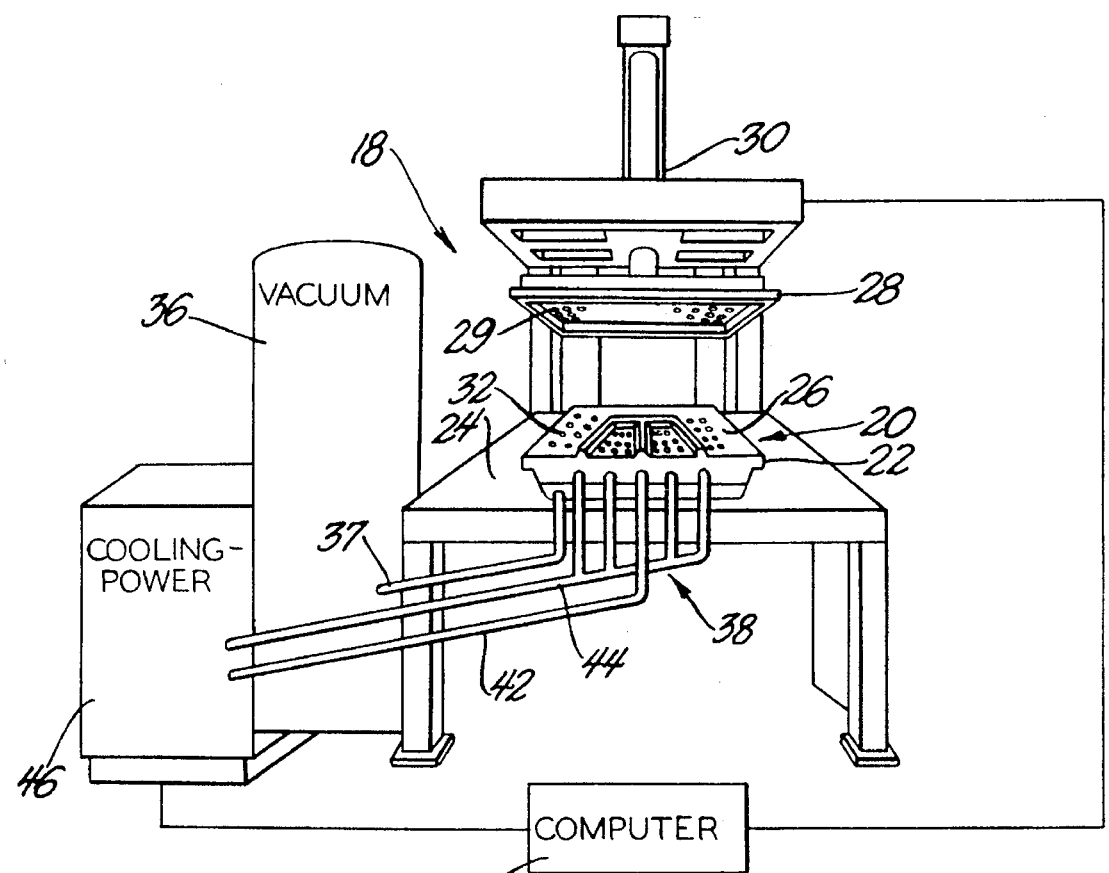
FIG. 1 is a perspective view of the bonding apparatus of the subject invention.

A bonding apparatus 18 which produces the seating assembly 10 is generally illustrated in FIG. 1 and schematically illustrated in FIGS. 4–8. The bonding apparatus 18 generally includes press means 20 for compressing the foam pad 12 against the adhesive layer 16 and fabric layer 14. The press means 20 comprises a lower contoured mold 22 supported on a support structure 24. The lower mold 22 has a contoured mold surface 26 which is adapted to support and contour the fabric layer 14. The contoured mold surface 26 is generally of the same contour as the seating surface or contoured surface 13 of the foam pad 12.

The press means 20 further includes an upper pressure platen 28 suspended from the support structure 24 above and in vertical alignment with the lower contoured mold 22 for pressing the assembly 10 within the bonding apparatus 18.

The upper platen 28 is movably connected to the support structure 24 by a suitable overhead actuator 30. The actuator 30 moves the platen 28 vertically against and away from the mold 22 to compress and release the assembly 10. The actuator 30 may be comprised of a pneumatic cylinder and rod for moving the platen, as known in the art, or any other suitable actuator 30.

The upper platen 28 includes perforations or air passages 29 extending therethrough. The lower contoured mold 22 also includes passages 32 extending therethrough from the contoured mold surface 26 to a mold cavity 34. The mold cavity 34 is air tight and connected to a vacuum source 36, typically a vacuum, for drawing air through the passages 32. The vacuum source 36 is connected to the cavity 34 by a vacuum conduit 37 which allows suction forces in the cavity 34, which in turn draws air through the passages 32 of the mold 22. Upon application of the vacuum source 36, air is drawn through the passages 29, 32.

Figure 3:
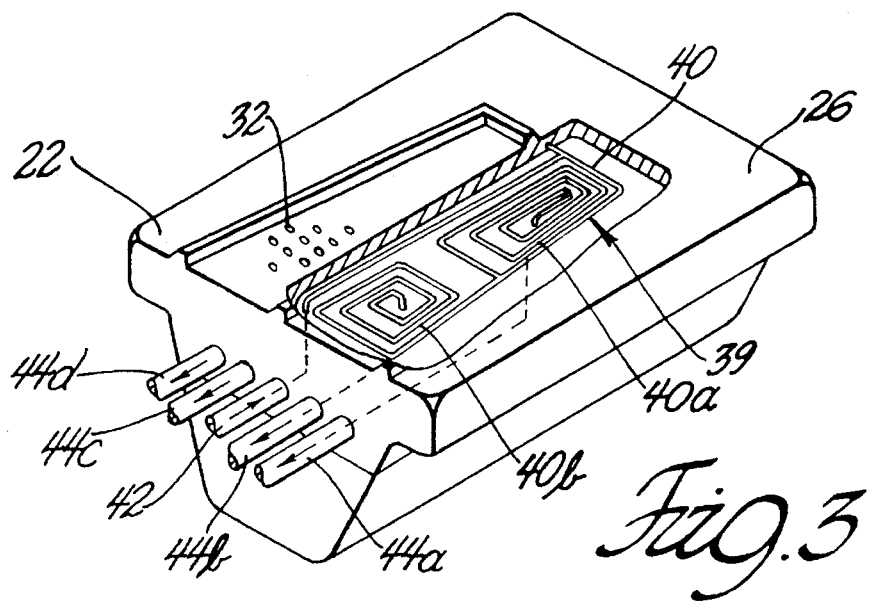
FIG. 3 is a perspective partially cut-away view of the mold showing half of the conductor design.

The apparatus 18 includes field generating means 38 for generating an electromagnetic field in the area of the assembly 10 to melt the adhesive layer 16. The field generating means 38 conducts an electrical current to create an electromagnetic field. The field generating means 38 includes conductor means 39 comprises continuous, hollow copper tubing 40 coiled through the lower contoured mold 22 adjacent the contoured mold surface 26 as illustrated in FIG. 3. The copper tubing 40 has an inlet end 42 and outlet ends 44 a, b, c, d which extend into the cavity 34 of the lower contoured mold 22. The inlet and outlets 42, 44 are connected to a power cooling source 46, as subsequently discussed. Illustrated in FIG. 3 is half of the coil of tubing 40, with the other half being a mirror image. The inlet end 42 provides positive power and the cooling water, which is divided to each of the four coils 40 (two coils 40a, 40b illustrated). The output ends 44 provide neutral power and the outlet of the cooling water, which are connected at the center of each coil 40, i.e., four outputs 44a, b, c, d.

In the preferred embodiment, as illustrated in FIG. 3, the copper tubing 40 is embedded within the lower contoured mold 22 slightly below the contoured mold surface 26 to prevent arcing of the coil layer 14, but to allow field induction with the adhesive layer 16. The lower contoured mold 22 generally comprises a ceramic or polymeric (thermoplastic or thermoset) resin embedding the coils of copper tubing 40 and providing the contoured mold surface 26, such as an epoxy and polypropylene glass reinforced die. The mold material is an insulator which prevents significant heat or electricity from being conducted from the copper tubing 40. The tubing 40 may be in a flat or contoured spiral with conductor diameter of 3/16 inch (4.5 mm)–1/8 inch (3 mm) tube with spacing approximately the same. However, the spacing and tube size can vary depending on the heating desired.

An alternative embodiment of the mold 22' and coil 40' arrangement is illustrated in FIG. 9. The class "A" surface 26' is similarly molded and of the same material as previously stated, and then the surface 26' is routed out to provide a recess 60 therein to receive the coiled tubing 40' flush with the surface 26'. This allows the tubing 40' to be as close to the adhesive layer 16 as possible. The coiled tubing 40' may include a FEP shrink wrap 62, i.e., Teflon, to protect the coils 40' and prevent arcing. Alternatively, a similar FET coating may lay over and cover the entire surface 26 of the mold 26' to protect the tubing 40'. The coil 40' configuration is the same as illustrated in FIG. 3.

The field generating means 38 includes the power and cooling source 46 for charging or transmitting current through the copper tubing 40 to generate the oscillatory electromagnetic field and magnetic flux which interacts with the magnetic particles in the adhesive film 16 to melt the adhesive 16 while allowing the foam pad 12 and the fabric layer 14 to be unaffected by the heating. The electromagnetic field causes heating only of the adhesive 16, while not inducing heat in the foam pad 12 or fabric layer 14. The conducting means 38 is directly connected to the tubing 40. The cooling portion comprises a pump for pumping the water therethrough to cool the copper tubing 40 during excitation thereof. This prevents significant heat from generating in the coil 40. The power and cooling source 46 are an rf generator as commonly available from Hellerbond Division of Alfred F. Leatherman Co., Inc. The power portion may operate between 1–9 MHz, typically at 3.3 MHz, and supply 150–300 amps, which may be variable depending on the tubing 50 design and/or adhesive 16 utilized.

The bonding apparatus 18 also includes control means 54 which is connected to the power and cooling source 46, the vacuum source 36 and the drive apparatus 30 for controlling the sequence of events and appropriate parameters thereof. The control means 54 may include an operator panel or keyboard and computer for operator instruction and intervention to operate the apparatus 18 in the steps as subsequently discussed.

Figure 4:
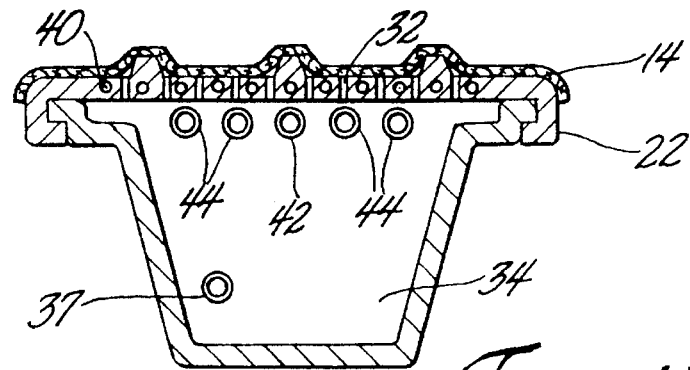
FIG. 4 is a schematic mold showing the trim cover placed over the mold.

The general process of forming the seating assembly 10 is illustrated in FIG. 4–8, which implementation by the control means 54 would be known by one skilled in the art. The fabric layer 14 is placed on the contoured mold surface 26 of the lower contoured mold 22 (FIG. 4).

Figure 5:
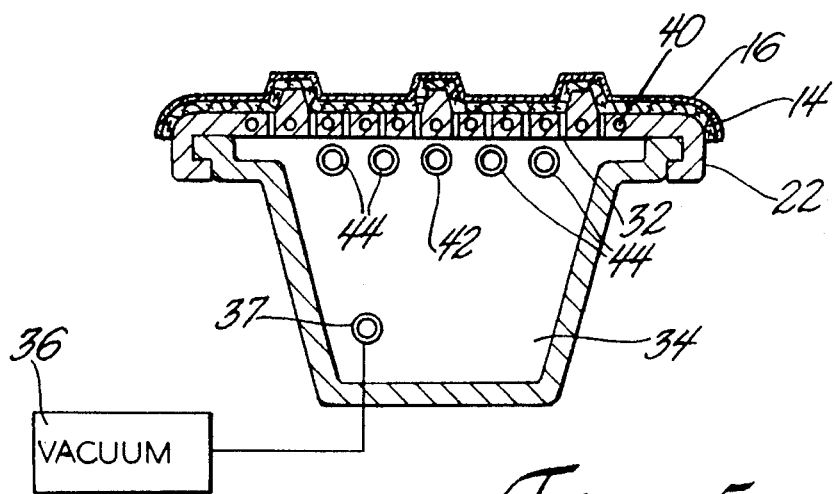
FIG. 5 is a schematic view showing application of the vacuum and placement of the adhesive sheet over the trim cover.

Thereafter, as illustrated in FIG. 5, the heat sensitive adhesive film 16 is placed on top of the fabric layer 14. The vacuum source 36 is activated to provide vacuum or suction through the passages 32 to pull the fabric layer 14 and adhesive sheet 16 against the mold 22. The adhesive sheet 16 is used to force the fabric layer 14 against the mold 22, especially in the case the fabric layer 14 is air permeable. At this time, any wrinkles in the fabric layer 14 may be removed as the fabric layer 14 is stretched against the contoured mold surface 26. The vacuum source 36 also maintains the fabric layer 14 in position once removal of wrinkles has occurred. The fabric layer 14 is generally at least slightly air permeable.

Figure 6:
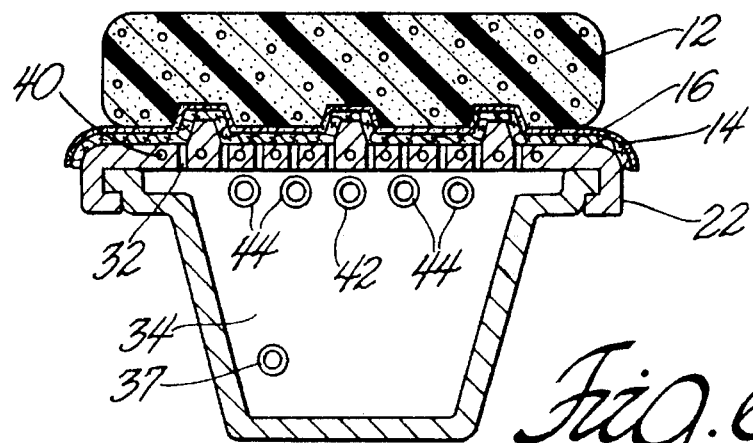
FIG. 6 is a schematic view showing application of the foam pad over the adhesive.
Figure 7:
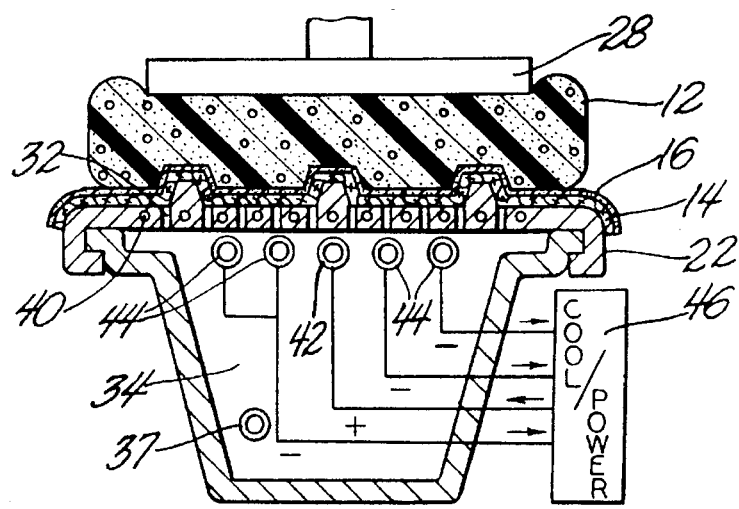
FIG. 7 is a schematic view showing compression of the assembled layers and energizing the coil to melt the adhesive.

Thereafter, the foam pad 12 is placed over the adhesive layer 16 (FIG. 6). The upper platen 28 is drawn down to compress the assembly 10 within the bonding apparatus 18 (FIG. 7). Approximately 20 psi is utilized for the compressing. The induction coil or copper tubing 40 is excited by the power source 50 to produce the magnetic field to generate magnetic flux and the cooling water is directed through the tubing 40 (FIG. 7). Energy losses due to eddy currents and hysteresis heat the film 16 at the interface. Generally, the power source 50 is set to 150 amps at 3.3 MHz frequency for less than two (2) minutes. The alternating source 50 is cycled on for 5–50 seconds for 3 times depending on the assembly 10 to ensure complete melting of the adhesive 16 and mold 22. The cooling source 46 pumps cold water through the copper tubing 40 to maintain the tubing cooled.

Figure 8:
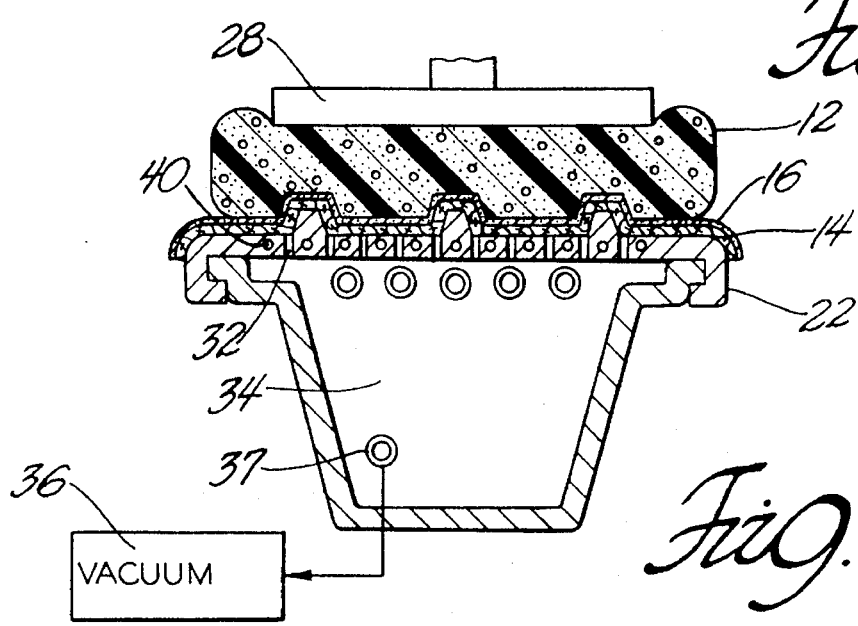
FIG. 8 is a schematic view showing ceasing application of the electromagnetic field and cooling the assembled cushion to cool the adhesive.

Thereafter, the field generating means 38 is ceased and the vacuum 36 is applied to draw air through the assembly 10 which cools the adhesive layer 16 (FIG. 8). Upon cooling and setting of the adhesive layer 16, the assembly 10 may be removed.

The adhesive 16 is formulated by compounding magnetic particles into a thermoplastic matrix, the magnetic particles being heated in the presence of the electromagnetic field. The adhesive layer 16 provides the induction medium which is placed between the foam pad 12 and the fabric layer 14 and is exposed to the oscillating electromagnetic field developed by the coils or copper tubing 40 which melts the induction medium thereby bonding the substrates together. Further, the process may be reversed by reheating the adhesive film 16 to re-melt the thermoplastic material and allow separation of the trim layer 14 from the foam pad 12. More specifically, the induction coil 40 may be excited to produce a magnetic field to cause further energy loss to re-heat the film 16 and allow separation of the trim layer 14.

The magnetic particle doping is a critical parameter in the induction bonding process. An induction heating system uses a work coil (i.e., copper tubing 40) as the primary circuit so that when the work coil is energized, the induced current flows through a secondary circuit. The magnetic particles in the adhesive 16 act as the secondary circuit which heat upon excitation. The heat dissipated during the induction process is transferred to the thermoplastic material. The heat is directed to the bond line, i.e., adhesive and does not pass through the mold 22 so that the fabric layer is undamaged.

More specifically, the adhesive layer 16 is a thermoplastic resin-type adhesive film, specifically, a polyamide resin which is doped with micron-sized ferromagnetic particles, such as ferric oxide and magnetic stainless steel. Upon magnetic induction, the ferromagnetic particles emit heat due to eddy current and hysteresis heat dissipated during the induction process which is transferred to the thermoplastic resin matrix.

The adhesive 16 includes iron powder (HA-9 available from Hellerbond) which has a particle distribution from 80 mesh (0.21 mm) to 40 mesh (0.47 mm). The adhesive 16 also includes a powder mix (No. 44052-1-1 available from Hellerbond) which consists of 33% ferric oxide (submicron particles) and 66% magnetic stainless steel (less than 0.17 mm). The stainless steel particle size is less than 0.17 mm. The two powder mixes are made into a film using the polyamide. The polyamide is available from Bostik, Inc., type #7239. The adhesive sheet 16 is formed 2 mils thick.

The evaluation of the adhesives was based on failure mode in the peel of the fabric layer 14 from the foam pad 12, (i.e., cohesive failure), the substrate deformation (burn through either of the layers), microscopic examination of the adhesive film (resin rich areas, particle size, particle density), time/temperature to melt adhesive film, breathability, potential statistical process control parameters for adhesive manufacturing (magnetic particle characterization, resin melt flow index, resin viscosity).

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of bonding a trim layer (14) to a foam pad (12), the method including the steps of:

placing a fabric trim layer (14) over a mold surface of an insulated contoured mold (22);

positioning a removable and separate, adhesive film (16) comprising magnetic particles in an air impervious thermoplastic material between the trim layer (14) and a precontoured foam pad (12) in the mold (22);

applying a vacuum pressure over the mold surface to draw the trim layer (14) and adhesive film (16) against tho mold surface to shape the trim layer (14) and the film (16) to conform with the contour of the foam pad (12);

placing the foam pad (12)onto the shaped adhesive film (40);

producing an oscillating electromagnetic field by excitation of induction coils (40) in the mold (22) to develop a flux between the coils (40) and the magnetic particles in the adhesive film (16) to develop a magnetic flux between the coils (40) and the magnetic particles in the adhesive film to generate hysteresis heat to melt the thermoplastic material;

compressing together the trim layer (14) and adhesive film (16) mid foam pad (12) in the mold (22) to disperse the thermoplastic material and bond the foam pad (22) and trim layer (14);

drawing air through the mold (22) to cool the melted adhesive film (16) and cure the bond between the trim layer (14) and foam pad (12); and providing an insulated mold (22) with the induction coils (40) embedded therein by non-magnetic material and passing cool liquid through the coils (40) to create energy loss due to eddy currents and hysteresis to heat the adhesive film (16).

2. A method as set forth in claim 1 further including providing the adhesive film (16) with ferromagnetic particles dispersed within the thermoplastic material.

3. A method as set forth in claim 2 further including providing the adhesive film (16) as substantially air impervious and separate to be removably placed between the trim layer (14) and the foam pad (12) prior to melting and drawing the trim layer (14) against the contour of the mold by the vacuum acting on the adhesive film (16).

4. A method as set forth in claim 3 further including reheating the adhesive film (16) to re-melt the thermoplastic material to allow separation of the trim layer (14) from the foam pad (12).

5. A method as set forth in claim 1 further including moving an upper platen (28) against the mold (22) to compress the trim layer (14), foam pad (12) and adhesive film (16) together.

6. A method as set forth in claim 5 further including drawing air by the vacuum through passages (32) in the mold to draw the trim layer (14) and adhesive film (16) against the mold (22).

7. A method as set forth in claim 2 further including the adhesive film including a polyamide as the thermoplastic material.

* * * * *